(12) United States Patent
Vitito

(10) Patent No.: US 7,804,421 B2
(45) Date of Patent: Sep. 28, 2010

(54) VEHICLE SAFETY SYSTEM

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 252 days.

(21) Appl. No.: 12/035,013

(22) Filed: Feb. 21, 2008

(65) Prior Publication Data
US 2008/0197997 A1 Aug. 21, 2008

Related U.S. Application Data

(60) Provisional application No. 60/902,345, filed on Feb. 21, 2007.

(51) Int. Cl.
*G08B 5/00* (2006.01)
(52) U.S. Cl. ............ 340/815.4; 340/435; 340/461; 340/815.45
(58) Field of Classification Search ............ 340/461, 340/540, 815.4, 815.45, 435, 901; 348/148
See application file for complete search history.

(56) References Cited

U.S. PATENT DOCUMENTS

| | | | |
|---|---|---|---|
| 6,809,704 B2 * | 10/2004 | Kulas | 345/1.2 |
| 6,953,735 B2 | 10/2005 | Yamazaki et al. | |
| 2003/0162312 A1 | 8/2003 | Takayama et al. | |
| 2005/0013100 A1 | 1/2005 | Stephany et al. | |
| 2005/0030256 A1 | 2/2005 | Tubidis et al. | |
| 2005/0218791 A1 | 10/2005 | Kawase | |
| 2006/0164230 A1 | 7/2006 | DeWind et al. | |
| 2007/0072154 A1 * | 3/2007 | Akatsuka et al. | 434/69 |

FOREIGN PATENT DOCUMENTS

| | | |
|---|---|---|
| JP | 2002-328624 | 11/2002 |
| JP | 2005-297762 | * 10/2005 |
| WO | WO98/39176 | 9/1998 |

* cited by examiner

*Primary Examiner*—Thomas J Mullen
(74) *Attorney, Agent, or Firm*—F. Chau & Associates, LLC

(57) ABSTRACT

A vehicle safety system includes a vehicle having at least one pillar. The at least one pillar includes an inner surface covered with a display surface. An exterior focused camera linked to the display surface for displaying an image taken by the camera upon the display material, wherein the camera takes an image of the exterior area of the vehicle that a driver would otherwise see if the at least one pillar were not blocking the view of the driver. A camera control mechanism links a driver sitting within a driver seat of the vehicle to the camera such that the camera may be adjusted to optimize the view provided upon the display surface along the inner surface of the at least one pillar.

15 Claims, 3 Drawing Sheets

VEHICLE SAFETY SYSTEM

CROSS REFERENCE TO RELATED APPLICATION

This application claims the benefit of U.S. Provisional Patent Application Ser. No. 60/902,345, filed Feb. 21, 2007, and entitled "AUTOMOBILE SAFETY SYSTEM".

BACKGROUND OF THE INVENTION

1. Field of the Invention

The present invention relates to vehicle safety systems. More particularly, the invention relates to a display system along the interior surface of the pillars of an automobile allowing a driver, or a passenger, to see objects that would otherwise be obstructed by the pillars of an automobile.

2. Description of the Prior Art

All automobiles include pillars that connect the primary body of the automobile to the roof of the automobile. These pillars always block a limited portion of the driver's view of the exterior environment, creating what are commonly referred to as "blind spots". The size of these blind spots is directly related to the width of the pillars used in an automobile. While manufactures have attempted to provide more and more window area to minimize the effects of pillars in creating blind spots, the problems associated with pillars still remain.

As such, those skilled in the art will appreciate that a need continues to exist to provide drivers with enhanced viewing of their surrounding environment. This is achieved by the present invention that provides for the inclusion of a display surface along the inner surface of automobile pillars.

SUMMARY OF THE INVENTION

It is, therefore, an object of the present invention to provide a vehicle safety system including a vehicle having at least one pillar. The at least one pillar includes an inner surface covered with a display surface. An exterior focused camera is linked to the display surface for displaying an image taken by the camera upon the display surface, wherein the camera takes an image of the exterior area of the vehicle that a driver would otherwise see if the at least one pillar were not blocking the view of the driver. A camera control mechanism links a driver sitting within a driver seat of the vehicle to the camera such that the camera may be adjusted to optimize the view provided upon the display surface along the inner surface of the at least one pillar.

It is also an object of the present invention to provide a vehicle safety system wherein the display surface is an organic LED.

It is another object of the present invention to provide a vehicle safety system including a plurality of pillars wherein each pillar is provided with a camera.

It is a further object of the present invention to provide a vehicle safety system wherein the camera control mechanism is manually adjusted by a driver.

It is still another object of the present invention to provide a vehicle safety system wherein the camera control mechanism includes a toggle member linked to the camera for controlling movement thereof.

It is another object of the present invention to provide a vehicle safety system wherein the toggle member includes an associated switch for switching transmission of movement signals generated by the toggle member among the cameras.

It is yet a further object of the present invention to provide a vehicle safety system including a servo-motor coupled to the camera for controlling movement thereof.

It is also an object of the present invention to provide a vehicle safety system wherein the camera control mechanism includes a driver position monitoring system.

It is still a further object of the present invention to provide a vehicle safety system wherein the driver position monitoring system includes proximity sensors associated with, and connected to, a processor to monitor the position of a driver as he or she sits within the vehicle.

It is yet another object of the present invention to provide an vehicle safety system including a servo-motor coupled to the camera for controlling movement thereof based upon signals received from the processor.

It is also an object of the present invention to provide a vehicle safety system wherein the proximity sensors are a series of lasers.

It is another object of the present invention to provide a vehicle safety system wherein the display surface is provided with a default mode in which the display surface is presented with an image coordinated with an interior décor of the vehicle.

It is a further object of the present invention to provide a vehicle safety system wherein the camera is secured to the at least one pillar.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a cross sectional view along the line 3-3 in FIG. 2.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
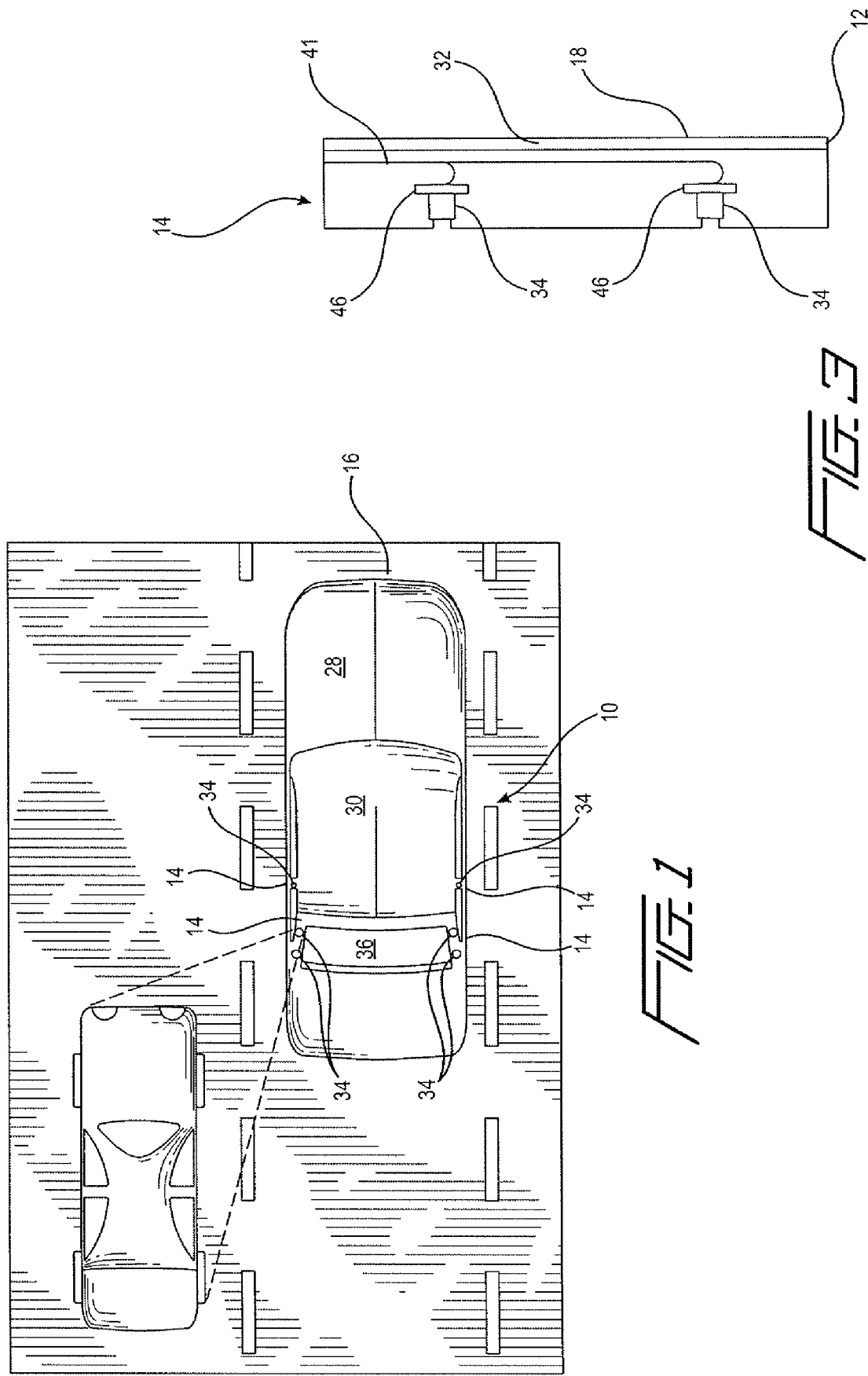
FIG. 1 is a schematic showing an automobile employing the present invention.
Figure 2:
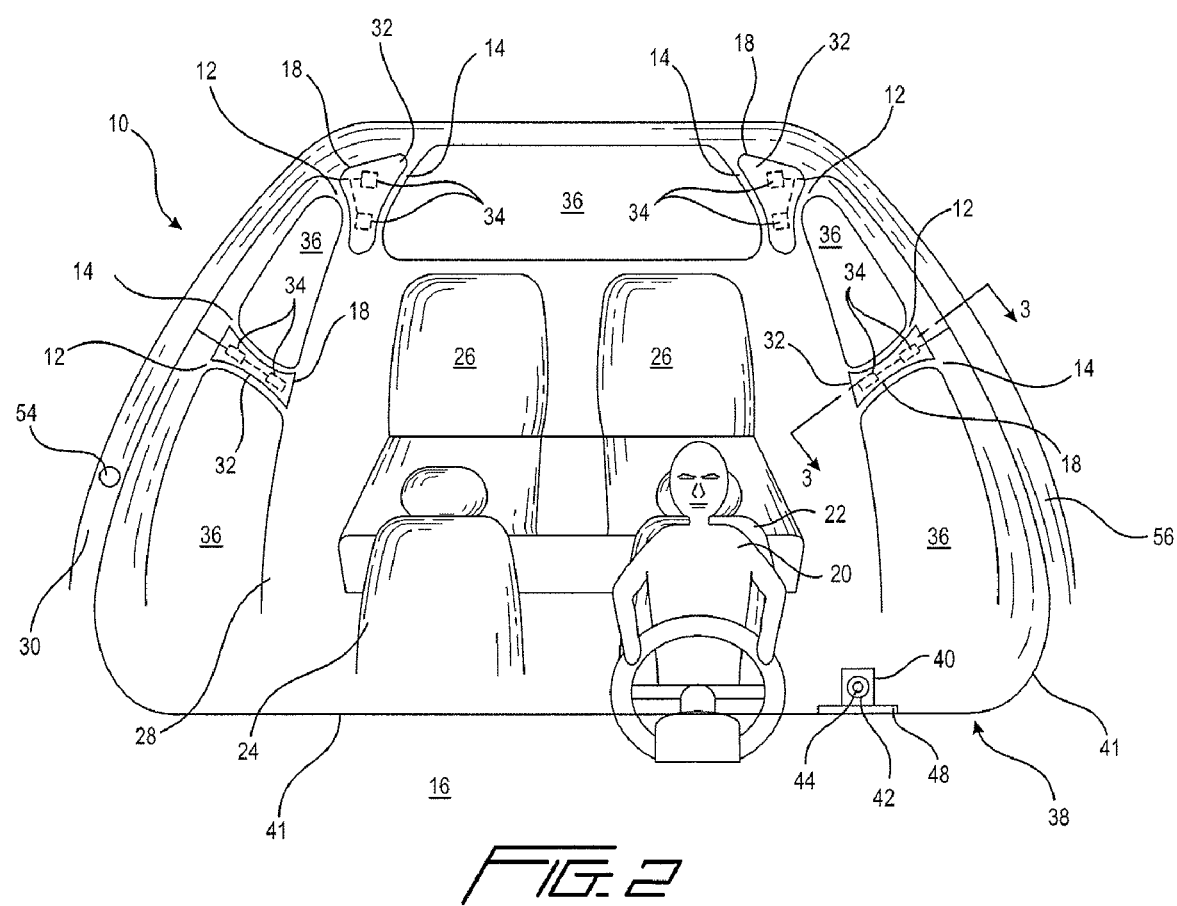
FIG. 2 is a schematic perspective view showing the present invention implemented within an automobile.

With reference to FIGS. 1 to 3, an automobile safety system 10 is disclosed. In accordance with a preferred embodiment of the present invention, the inner surfaces 12 of the pillars 14 located within an automobile 16 are covered with respective display surfaces 18 such that objects which would otherwise be blocked by the pillars 14 are shown on the display surfaces 18. As a result, a driver 20 looking rearwardly or sidewardly within his or her automobile 16 can see objects which would otherwise be blocked by the pillars 14. Although the present invention is disclosed with reference to automobiles, those skilled in the art will appreciate the concepts of the present invention may be applied to a variety of vehicles without departing from the spirit of the present invention.

With this in mind, the automobile 16 includes a traditional driver seat 22 and passenger seat 24 located in the front of the automobile 16. The automobile 16 may also include traditional rear seats 26. The automobile 16 also includes a series of upwardly extending pillars 14 connecting the primary body 28 of the automobile 16 to the roof 30 of the automobile 16. Although only four pillars are disclosed in presenting a preferred embodiment of the present invention, those skilled in the art will appreciate automobile constructions dictate different pillar constructions and more or less pillars may employ the concepts of the present invention. The pillars 14 are substantially opaque and cannot be seen through as a driver 20 looks rearwardly and/or sidewardly to see adjacent traffic and/or objects while driving the automobile 16.

In accordance with the present invention, the inner surface 12 of each of these pillars 14 is covered with a display material 32; for example, organic LEDs (light-emitting diode), or other display materials that are comparably suitable for the purposes of the present invention, to define the various display surfaces 18 within the automobile 16. The display surfaces 18 are electrically linked to respective cameras 34 discussed below in greater detail. As such, the display surfaces 18 are provided with conventional electronics required to permit the display of an image thereon as transmitted to the display surface 18 by the cameras 34. As a result, and as is discussed below in greater detail, the display surfaces 18 allow a driver to view objects outside the automobile 16, which would otherwise be blocked from the driver's view by the pillars 14.

More particularly, the source for the images displayed upon the display surfaces 18 of the various pillars 14 is achieved by positioning exterior focused cameras 34 at, and preferably upon, each of the pillars 14 such that the cameras 34 may take an image of the exterior area of the automobile 16 that the driver 20 would otherwise see if the pillars 14 in the automobile 16 were not blocking the driver's view and display that image upon the display materials 32 of the respective display surfaces 18 located along the inner surfaces 12 of the pillars 14. In particular, and in accordance with a preferred embodiment of the present invention, at least one camera 34 (although it is contemplated in accordance with a preferred embodiment that a plurality of cameras 34 will be secured to each pillar 14 to ensure complete coverage) is secured to each pillar 14, with the camera 34 facing away from the pillar 14 toward the exterior environment of the automobile 16 for recording the environment for display upon the display material 32 of the display surface 18 along the inner surface 12 of the pillar 14.

However, and as those skilled in the art will appreciate, drivers 20 are of various sizes and sit at various locations within the passenger compartment of the automobile 16. The angular orientation of the driver's 20 head relative to the inner surface 12 of the pillars 14 is critical in providing the driver 20 with an accurate presentation of the images blocked by the pillars 14 such that when a driver 20 looks rearwardly and/or sidewardly he or she will see a continuous view of the external environment as he or she looks through the various windows 36 and at the display material 32 of the display surface 18 presented upon the respective inner surfaces 12 of the pillars 14.

With this in mind, the driver 20 is provided with a camera control mechanism 38 linking the driver 20 to the various external cameras 34 such that the driver may manually adjust these cameras 34 to optimize the view provided along the respective display surfaces 18 on the inner surfaces 12 of the pillars 14, or other surfaces, of the automobile 16. In accordance with a preferred embodiment of the present invention, the camera control mechanism 38 operates in much the same manner as current side view mirror control systems.

In particular, and in accordance with a preferred embodiment of the present invention, the driver 20 is provided with a toggle member 40 which is moved in a variety of directions. The toggle member 40 includes a sensor 42 which monitors movement of the toggle 44 and issues appropriate movement signals. The toggle member 40, and particularly, the sensor 42 of the toggle member 40, is electrically connected via wires 41 to various servo-motors 46 respectively coupled to the various external cameras 34 providing images for display upon the display material 32 of the display surfaces 18 on the inner surfaces 12 of the pillars 14. Movement of the toggle member 40, therefore, generates movement signals issued by the sensor 42. The movement signals are transmitted to the servo-motors 46 which then accordingly move the respective external cameras 34.

Since there are multiple external cameras 34, the toggle member 40 includes an associated switch 48 for switching transmission of movement signals among the various servo-motors 46 associated with the external cameras 34. A single toggle member 40 may, therefore, be used to adjust all of the external cameras 34 through simple actuation of the switch 48. In accordance with a preferred embodiment of the present invention, the switch 48 is substantially similar to those associated with adjusting the driver and passenger side-view mirrors, although the switch used in accordance with the present invention includes more than 2 switching options to accommodate control of all the external cameras used in implementation of the present invention.

As a result, and after the driver 20 has positioned himself or herself for driving, the driver 20 will begin adjusting the various external cameras 34 via actuation of the toggle member 40. This is done by simply turning one's head as if naturally looking about the automobile 16 and adjusting the cameras 34 such that the displays shown upon the respective display surfaces 18 of the various automobile pillars 14 are properly aligned such that a continuous view of the external environment is provided as he or she looks through the various windows 36 and at the displays presented upon the display surfaces 18 along the inner surfaces 12 of the pillars 14.

Figure 4:
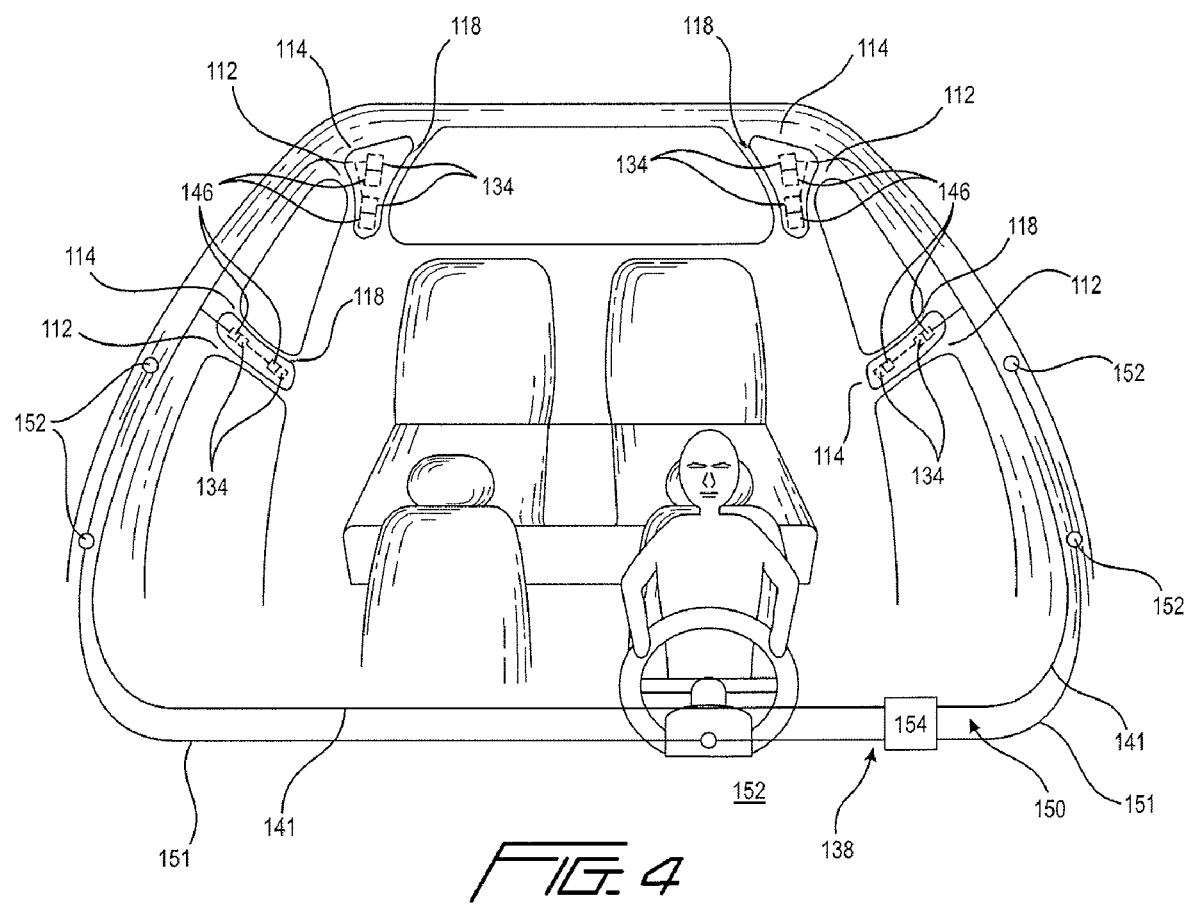
FIG. 4 is a schematic perspective view in accordance with an alternate embodiment of the present invention.

In accordance with an alternate embodiment, and with reference to FIG. 4, adaptive orientation of the cameras 134 is achieved through the utilization of a camera control mechanism 138 including a driver position monitoring system 150. The driver position monitoring system 150 employs proximity sensors, for example, a series of lasers, 152 associated with, and connected to (for example, via wires 151), a processor 154 to monitor the position of a driver 120 as he or she sits within the automobile 116. From this information, the proper positioning of the cameras 134 is calculated and the processor 154 issues movement signals to the servo-motors 146 (connected to the processor 154 via wires 141) of the various cameras 134 to control movement of the cameras 134 for ideally positioning the external cameras 134 to provide accurate displays upon the inner display surface 118 located along the inner surfaces 112 of the pillars 114.

It is further contemplated that it will not always be desirable to present displays of the exterior environment upon the display surfaces 18 located along the inner surfaces 12 of the pillars 14. As such, the display surfaces 18 are further provided with a default mode in which the display surfaces 18 are presented with an image for displaying to the passengers within the automobile 16, wherein the image is preferably coordinated with the interior décor of the automobile 16. This may either be achieved by providing cameras 54 within the automobile 16 that display, for example, the headliner 56 along the displays of the pillar or via a preprogrammed display that is presented along the pillars of the automobile.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A vehicle safety system, comprising:
   a vehicle including at least one pillar, the at least one pillar including an inner surface covered with a display surface;
   an exterior focused camera linked to the display surface for displaying an image taken by the camera upon the display surface, wherein the camera takes an image of an exterior area of the vehicle that a driver would otherwise see if the at least one pillar were not blocking a view of a driver; and
   a camera control mechanism linking a driver sitting within a driver seat of the vehicle to the camera such that the camera may be adjusted to optimize the view provided upon the display surface along the inner surface of the at least one pillar, wherein the camera control mechanism includes a driver position monitoring system including sensors to monitor the position of a driver as he or she sits within the vehicle.

2. The vehicle safety system according to claim 1, wherein the display surface is an organic LED.

3. The vehicle safety system according to claim 1, further including a plurality of pillars wherein each pillar is provided with a camera.

4. The vehicle safety system according to claim 3, wherein the camera control mechanism is manually adjusted by a driver.

5. The vehicle safety system according to claim 4, wherein the camera control mechanism includes a toggle member linked to the cameras for controlling movement thereof.

6. The vehicle safety system according to claim 5, wherein the toggle member includes an associated switch for switching transmission of movement signals generated by the toggle member among the cameras.

7. The vehicle safety system according to claim 5, further including a servo-motor coupled to each of the cameras for controlling movement thereof.

8. The vehicle safety system according to claim 1, wherein the sensors include proximity sensors associated with, and connected to, a processor.

9. The vehicle safety system according to claim 8, further including a servo-motors coupled to the cameras for controlling movement thereof based upon signals received from the processor.

10. The vehicle safety system according to claim 9, wherein the proximity sensors are a series of lasers.

11. The vehicle safety system according to claim 1, wherein the camera control mechanism is manually adjusted by a driver.

12. The vehicle safety system according to claim 11, wherein the camera control mechanism includes a toggle member linked to the camera for controlling movement thereof.

13. The vehicle safety system according to claim 12, further including a servo-motor coupled to the camera for controlling movement thereof.

14. The vehicle safety system according to claim 1, wherein the camera is secured to the at least one pillar.

15. A vehicle safety system comprising:
    a vehicle including at least one pillar, the at least one pillar including an inner surface covered with a display surface;
    an exterior focused camera linked to the display surface for displaying an image taken by the camera upon the display surface, wherein the camera takes an image of an exterior area of the vehicle that a driver would otherwise see if the at least one pillar were not blocking a view of a driver; and
    a camera control mechanism linking a driver sitting within a driver seat of the vehicle to the camera such that the camera may be adjusted to optimize the view provided upon the display surface along the inner surface of the at least one pillar, wherein the display surface is provided with a default mode in which the display surface is presented with an image coordinated with an interior decor of the vehicle.

* * * * *